United States Patent
Espinoza et al.

(10) Patent No.: US 8,894,939 B2
(45) Date of Patent: Nov. 25, 2014

(54) THREE PHASE REACTOR

(75) Inventors: Rafael Espinoza, Tulsa, OK (US); Kenneth L. Agee, Tulsa, OK (US)

(73) Assignee: Emerging Fuels Technology, Inc., Tulsa, OK (US)

( * ) Notice: Subject to any disclaimer, the term of this patent is extended or adjusted under 35 U.S.C. 154(b) by 0 days.

(21) Appl. No.: 13/211,078

(22) Filed: Aug. 16, 2011

(65) Prior Publication Data
US 2013/0084223 A1 Apr. 4, 2013

Related U.S. Application Data

(60) Provisional application No. 61/374,194, filed on Aug. 16, 2010.

(51) Int. Cl.
*B01J 8/18* (2006.01)
(Continued)

(52) U.S. Cl.
CPC ............. *B01J 8/1827* (2013.01); *B01J 8/1836* (2013.01); *B01J 8/226* (2013.01);
(Continued)

(58) Field of Classification Search
CPC ............. B01J 8/00; B01J 8/005; B01J 8/006; B01J 8/08; B01J 8/085; B01J 8/087; B01J 8/18; B01J 8/1818; B01J 8/1827; B01J 8/1836; B01J 8/1845; B01J 8/1881; B01J 8/20; B01J 8/22; B01J 8/224; B01J 8/226; B01J 8/24; B01J 8/34; B01J 8/36; B01J 19/00; B01J 19/24; B01J 2208/00; B01J 2208/00008; B01J 2208/00017; B01J 2208/00106; B01J 2208/00141; B01J 2208/00265; B01J 2208/00292; B01J 2208/003; B01J 2208/00796; B01J 2208/00823; B01J 2208/00831; B01J 2208/0084; B01J 2208/00893; B01J 2208/00902; B01J 2219/18; B01J 2219/182; C07C 1/00; C07C 1/02; C07C 1/04; C07C 1/0405; C07C 1/041; C07C 1/0415; C07C 1/042; C07C 1/0425; C07C 1/043; C10L 3/00; C10L 3/06; C10L 3/08; C10L 3/10; C10G 2/00; C10G 2/32; C10G 2/34; C10G 2/342
USPC ................. 422/129, 139, 140, 187, 198, 211; 518/728
See application file for complete search history.

(56) References Cited

U.S. PATENT DOCUMENTS 3,298,793 A * 1/1967 Mallison et al. .............. 422/143
3,556,989 A    1/1971 Weber et al.
(Continued)

FOREIGN PATENT DOCUMENTS

DE    2204539 A1    8/1973
EP    1095697 A1 *  5/2001
(Continued)

*Primary Examiner* — Natasha Young
(74) *Attorney, Agent, or Firm* — Head, Johnson & Kachigian, P.C.

(57) ABSTRACT

A reactor for carrying out a chemical reaction in a three phase slurry system providing a horizontal reaction vessel with a cross sectional area which is dependent on the vessel length, vessel diameter, and axial position. The vessel has a gas inlet at or near the bottom of the reaction vessel and a gas distributor. The gas product exits the vessel by conduit means at or near the top of the reaction vessel. The vessel includes a plurality of horizontal cooling coils to provide a cooling medium to the slurry. In the reaction vessel, the synthesis gas has an average linear velocity which is a function of the vessel cross sectional area.

5 Claims, 3 Drawing Sheets

(51) Int. Cl.
*B01J 8/22* (2006.01)
*B01J 8/00* (2006.01)
*B01J 19/00* (2006.01)
*B01J 19/24* (2006.01)
*C10L 3/00* (2006.01)
*C10L 3/06* (2006.01)
*C10L 3/08* (2006.01)
*C10L 3/10* (2006.01)
*C10G 2/00* (2006.01)
*C07C 1/00* (2006.01)
*C07C 1/02* (2006.01)
*C07C 1/04* (2006.01)

(52) U.S. Cl.
CPC ............... *B01J 8/006* (2013.01); *C10G 2/342* (2013.01); *B01J 2208/00141* (2013.01); *B01J 2208/003* (2013.01); *B01J 2208/0084* (2013.01); *B01J 2208/00902* (2013.01); *B01J 2219/182* (2013.01)
USPC ........... 422/140; 422/129; 422/139; 422/187; 422/198; 422/211; 518/728

(56) References Cited

U.S. PATENT DOCUMENTS

| | | | | |
|---|---|---|---|---|
| 3,644,192 | A * | 2/1972 | Li et al. | 208/408 |
| 3,887,453 | A * | 6/1975 | Ueta et al. | 208/409 |
| 5,268,344 | A * | 12/1993 | Pedrick et al. | 502/30 |
| 5,382,748 | A * | 1/1995 | Behrmann et al. | 585/899 |
| 6,262,131 | B1 * | 7/2001 | Arcuri et al. | 518/700 |
| 6,676,906 | B1 * | 1/2004 | Heisel | 422/601 |
| 6,903,141 | B2 * | 6/2005 | Zhou et al. | 518/719 |
| 7,022,741 | B2 | 4/2006 | Jiang et al. | |
| 7,135,152 | B2 | 11/2006 | Espinoza et al. | |
| 7,232,848 | B2 | 6/2007 | Mohedas et al. | |
| 8,119,014 | B2 * | 2/2012 | Soto et al. | 210/800 |
| 2008/0221367 | A1 * | 9/2008 | Hollander et al. | 568/571 |

FOREIGN PATENT DOCUMENTS

| | | |
|---|---|---|
| WO | 02076601 A1 | 10/2002 |
| WO | 2007/086610 A1 | 8/2007 |
| WO | WO 2009/114847 A1 * | 9/2009 |

* cited by examiner

THREE PHASE REACTOR

CROSS-REFERENCE TO RELATED APPLICATIONS

This application claims priority to U.S. Provisional Application No. 61/374,194, filed Aug. 16, 2010, which is herein incorporated in its entirety by reference.

BACKGROUND OF THE INVENTION

1. Field of the Invention

The present invention relates in general to a reactor and a process for the preparation of hydrocarbons from synthesis gas, typically known as the Fischer-Tropsch process. More particularly, this invention pertains to a three phase slurry bubble column reactor that can maximize the production rate per unit volume of the reactor.

2. Prior Art

The Fischer-Tropsch process is the second step of a two step process that converts natural gas to liquid fuels. The first step in the conversion process transforms carbonaceous feedstock such as natural gas, coal, petroleum coke, heavy oils, biomass, landfill gas, biogas and municipal waste into a synthesis gas comprised of carbon monoxide and hydrogen. The second step, which is commonly known as the Fischer-Tropsch process, converts the synthesis gas over a suitable catalyst into a wide range of hydrocarbons such as methanol, mixed alcohols, olefins, paraffinic hydrocarbons and mixtures thereof. These materials are useful for production of chemical and fuel products.

The Fischer-Tropsch process is a reaction that aims to produce hydrocarbons that contain five or more carbon atoms per molecule. Therefore, the catalyst and operating conditions are selected to reduce the formation of methane.

Various types of reactors have been employed for Fischer-Tropsch and related synthesis reactions. Fischer-Tropsch reactors include fixed bed reactors, fluidized bed reactors, and gas-agitated three phase reactors often called "slurry bubble column" reactors. Slurry bubble column reactors operate by suspending catalytic particles in liquid hydrocarbons creating a "slurry" mixture, and then pumping synthesis gas reactants through the bottom of the reactor to create small gas bubbles. As the gas bubbles containing reactants rise in the reactor, they absorb into the slurry mixture and diffuse into the catalyst particles where they are converted into gaseous and liquid hydrocarbon products. The gaseous products are collected at the top of the reactor and the liquid products are separated from the slurry by a variety of separation techniques.

Slurry bubble column reactors are favored over fixed bed reactors because they utilize smaller catalyst particles and have better heat and mass transfer capabilities. However, the slurry bubble column reactor is both costly and difficult to scale up.

One of the main constraints with current technology for three phase reactors, and in particular Fischer-Tropsch slurry bed reactors, is the relationship between the reactor vessel diameter and the reactor vessel height. Slurry bubble column reactors can operate at different velocities. When gas is fed into the reactor at a low linear velocity, carbon monoxide conversion proceeds at a relatively high rate as compared with the reactor height, thereby reaching high CO conversions at relatively low reactor heights. As a result, only a small portion of the CO will remain to react in the upper portion of the reactor. Because a water molecule is formed as every CO molecule is converted, the high rate of CO conversion also increases the partial pressure of water. High water partial pressures increase the rate of deactivation of Fischer-Tropsch catalysts and are therefore undesirable. To counter these undesirable effects, a Fischer-Tropsch slurry bubble column reactor would either need to have an impractical, low height or operate at conditions providing low Fischer-Tropsch conversion rates, such as low temperature, to avoid reaching higher partial pressure of water. The reactor would thus have a much lower total productivity than desired.

Another approach to avoid the high water partial pressure and/or have a higher total productivity is to operate at high gas linear velocities, which would alleviate the high percentage of CO conversion at relatively low reactor heights. While this reactor will have a higher total productivity than the other approach described earlier, the percentage of CO conversion per reactor unit volume will be lower than can be achieved by running the reactor at lower gas linear velocities. Also, as the gas linear velocity increases, the volume percentage of gas in the reactive section of the reactor (gas hold up or GHU) increases. Due to this increase in gas hold up, there is an upper limit for the gas linear velocity, above which, the reactor productivity actually declines. Reactors that operate at higher gas linear velocities will typically have diameters between 10 and 11 meters, with a height of 30 meters or more. Typical operating conditions for slurry bubble column Fischer-Tropsch reactors are at temperatures between 180 and 260° C., and pressures between 10 and 40 bar, with the reactor vessel being a pressure vessel. Because of the operating conditions, and the large reactor shell dimensions, there are very few places in the world where these vessels can be constructed. The current delivery time for reactor shell production is years rather than months. This has a severe negative effect toward the application of the Fischer-Tropsch slurry bed technology worldwide.

Another problem with current slurry bed reactor technology is the complex hydrodynamic regime inside the slurry bed units. In order to achieve high productivity, reactors need to have large diameters and heights. Under these conditions it is difficult, costly and complex to predict the reactor hydrodynamic profile inside the large commercial unit. Very few companies worldwide can afford to construct demonstration plants in order to assess the complex hydrodynamic regime inside slurry bed units.

Yet, another problem with current slurry bed reactor technology is the difficulty with separating the catalyst from the liquid hydrocarbon products. The current approach is to develop attrition-resistant catalysts. If the catalysts attrite, small particles are created which lowers the efficiency of the solid-liquid separation system, irrespective of whether the assembly consists of filters, settlers, hydro cyclones, magnetic techniques, or a combination of the above techniques. Catalysts also have to operate in a large diameter reactor of over 20 meters high, at linear velocities that result in a churn turbulent flow hydrodynamic regime. Under these conditions, the catalyst particles can travel at linear velocities close to 2 m/s and at higher velocities in the central section of the reactor. The central section of the reactor has a higher than average gas hold up and bubble size and therefore high turbulence. Therefore the particle to particle collisions and collisions with reactor internals such as cooling coils caused by catalysts moving at high linear velocities in the central section of the reactor will inevitably result in catalyst attrition. Under these conditions, an "attrition resistant" catalyst is necessary.

Accordingly, it is a principal object and purpose of the present invention to provide a three phase reactor, applicable in the Fischer-Tropsch process, which solves or minimizes the problems described above. The present invention provides a slurry bubble column reactor that has high productivity per unit volume which is largely independent from the total productivity per reactor.

The reactor of the present invention operates in a regime which lowers the rate of catalyst attrition for any given catalyst and is significantly easier to scale-up for commercial application.

SUMMARY OF THE INVENTION

The present invention provides a slurry bubble column, multiphase reactor that has high productivity per unit volume which is largely independent from the total productivity per reactor. The reactor of the present invention operates in a regime which lowers the rate of catalyst attrition for any given catalyst and is significantly easier to scale-up for commercial application.

The present invention is a reactor vessel assembly consisting of a horizontally oriented reaction vessel. The horizontal reaction vessel is distinguished from current reactor technology that is vertically aligned having a reactor diameter. The cross sectional area of the reactor of the present invention is not defined by the reactor diameter, but has cross sectional horizontal area which is a function of the vessel length, vessel diameter, and axial position. The synthesis gas enters the reaction vessel by way of a gas inlet at or near the bottom of the reaction vessel. The synthesis gas moves at a velocity which is a function of the axial position of the synthesis gas inside of the vessel reactor. The gas linear velocity will be higher at the inlet at the bottom of the reactor and will decrease as the bubble rises, approaching the middle of the vessel diameter which provides for a larger cross sectional area. After the synthesis gas reaches the middle of the vessel diameter, the gas linear velocity will increase as the cross sectional area of the vessel decreases. The gas phase volume contracts as the number of product mols is lower than the number of reactant mols, which will counter the increase in velocity. The cross sectional area in the reactor is defined as:

$$CSA = L\, Wy$$

Where, L is the vessel length, and Wy is the width of the vessel at height y.

With the present invention, for any given synthesis gas feed flow, the average gas linear velocity is now a function of the vessel diameter and the vessel length. As compared to prior art, the additional variable of the vessel length determining gas linear velocity provides for the previously absent freedom to vary the gas linear velocity without changing the vessel diameter or operating conditions. Variation of the vessel length will also allow for the freedom to separate the total production volume from the reactor height. Thus, the reactor volume may be increased, while maintaining a constant gas linear velocity, simply by increasing the vessel length but keeping the vessel diameter constant.

In this invention, it is therefore possible to economically operate at linear velocities that are low enough to be in the homogenous gas flow regime, resulting in a high percentage of carbon monoxide conversion in a relatively short reactor height, while concurrently using a large synthesis gas feed flow that is distributed along the length of the reactor vessel. Thus, the present invention allows for a high carbon monoxide conversion per reactor unit volume resulting in a high level of production per reactor.

Compared to prior art slurry bed reactors, the vessel diameter according to the present invention does not have to be within the same range as the reactor diameter in typical slurry bed Fischer-Tropsch reactor technology. The total synthesis gas feed flow, which will determine the reactor capacity, will be accommodated for by increasing the reactor vessel length.

For example, a typical slurry bed with a diameter of 10 m has a cross sectional area (not including internal structures) of about 78.54 m². The reactor of the present invention will have a similar cross sectional area (at its higher point) if the vessel diameter is 5.25 m and the vessel length is 30 m. The number of manufacturers worldwide that can produce a 5.25 m diameter vessel is more abundant than the number of manufacturers that can produce a vessel with a 10 m diameter. Thus, the present invention reduces duration of manufacturing and increases the number of potential fabricators.

In the present invention, the catalyst located in the slurry mixture will be subjected to a much milder attrition regime due to the low gas linear velocity and the low reactor height.

Compared to prior technology, the reactor of the present invention is much quicker and less costly to scale up. The hydrodynamic regime can be studied by using sectional slices of the reactor, preferably at different vessel diameters. The reactor regime will be more predictable because an increase in vessel length will have only a small effect on the reactor hydrodynamics, and as such, this effect will only decrease as the ratio between the vessel length and the vessel diameter increases. The implementation of low gas linear velocity will also allow for the hydrodynamic regime to be more easily modeled and understood.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the inventions construction and the arrangement of its components without departing from the spirit and scope of this disclosure. It is understood that the invention is not limited to the embodiment set forth herein for purposes of exemplification.

Figure 1:
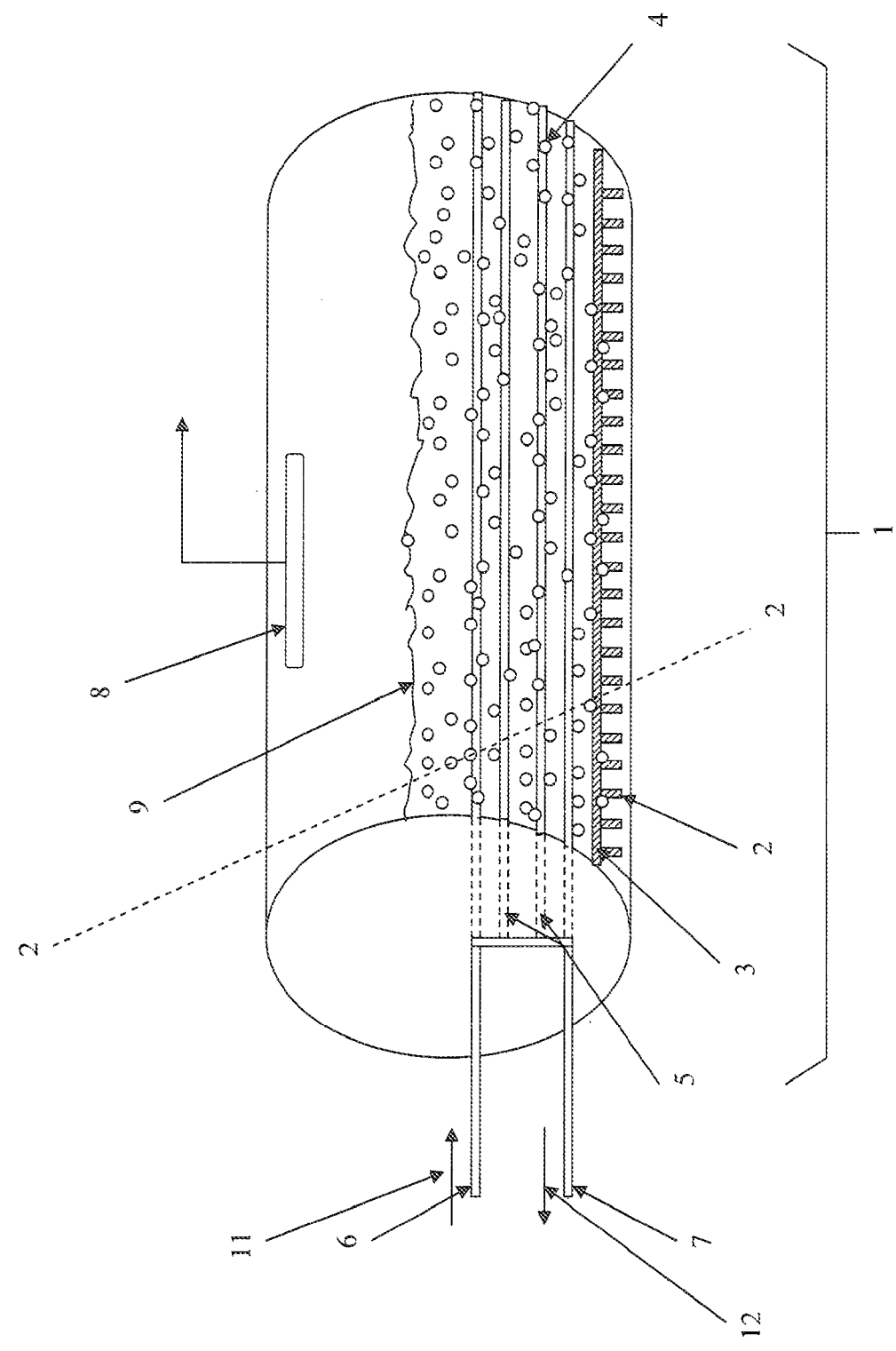
FIG. 1 illustrates a perspective view of a preferred embodiment of a three phase slurry bubble column reactor constructed according to the present invention which is partially cut away for clarity.

The present invention provides an assembly for a three phase slurry bubble column reactor for use in the Fischer-Tropsch process. Referring to the drawings in detail, FIG. 1 illustrates a perspective view of a three phase slurry bubble column reactor vessel according to the present invention. The reactor vessel is a closed container except as described herein. Synthesis gas is fed into the slurry bubble column reactor vessel 1 by means of a gas distributor 2 which can be composed of a plurality of horizontal pipes located near the lower most portion of the reactor vessel. The gas distributor 2 may have orifices in the lower section of the pipes, including a shroud 3 to decrease the gas linear velocity as it contacts the liquid in order to minimize catalyst attrition. The gas forms bubbles 4 that rise in the liquid-solid (slurry) mixture, forming the three phase system. The rising gas acts to mix or agitate the slurry inside the reactor as it moves upward during operation.

The reactor also includes a plurality of cooling coils 5 to remove the heat from the exothermic Fischer-Tropsch reaction. The coils 5 may be a continuous set of horizontal tubes connected at alternating ends with an inlet 6 and outlet 7. The cooling medium enters an inlet 6, as illustrated by arrow 11, which is connected to one or more cooling coils 5 and exits through an outlet 7, as illustrated by arrow 12, after cooling the slurry inside the reactor. The cooling medium may be composed of water or oil.

The excess synthesis gas that does not react as well as gaseous and entrained hydrocarbon products are removed through a conduit 8 located above the slurry level 9. Before the synthesis gas enters the conduit 8, it may go first through a step to remove entrained liquid and/or solids before it exits the reactor. This may be accomplished by means of standard technology like demisters, hydro cyclones, distillation, etc (not shown).

Figure 2:
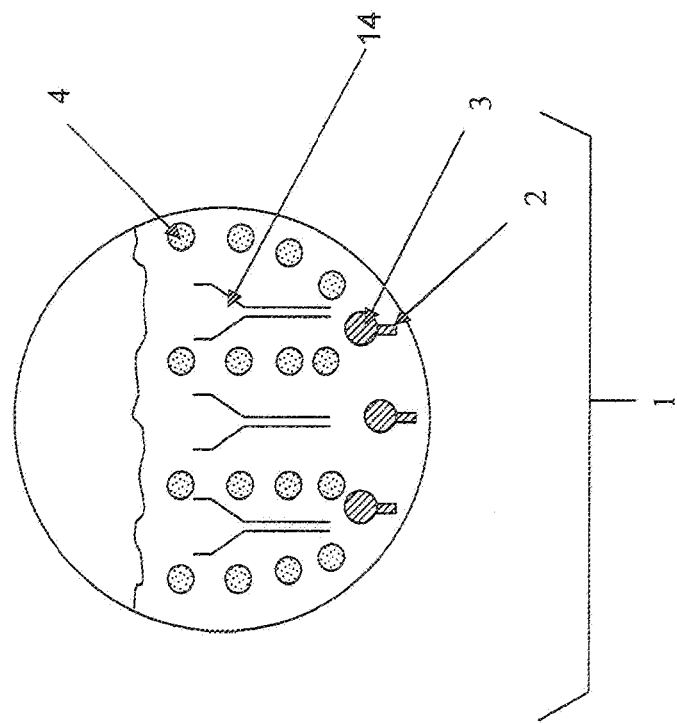
FIG. 2 illustrates a sectional view of a three phase slurry bubble column reactor taken along section line 2-2 of FIG. 1 according to the present invention.

FIG. 2 illustrates a simplified sectional view of a three phase slurry bubble column reactor according to the present invention as taken along section line 2-2 of FIG. 1. Synthesis gas is fed into the slurry bubble column reactor 1 by means of a gas distributor 2 which may be composed by a horizontal pipe(s). The gas distributor 2 may have orifices in the lower section of the pipe, including a shroud 3 to decrease the gas linear velocity as it contacts the liquid in order to minimize catalyst attrition. The gas forms bubbles 4 that rise in the liquid-solid (slurry) mixture, forming the three phase system.

Due to the relatively low linear gas velocity inside the reactor, the circulation inside the reactor may need enhancement in order to maintain suspension of the catalyst particles. Circulation may be provided by means of conventional internal draft tubes 14 which may be distributed radially. Nozzles and catalyst filtration are left out of the figure for simplification.

Figure 3:
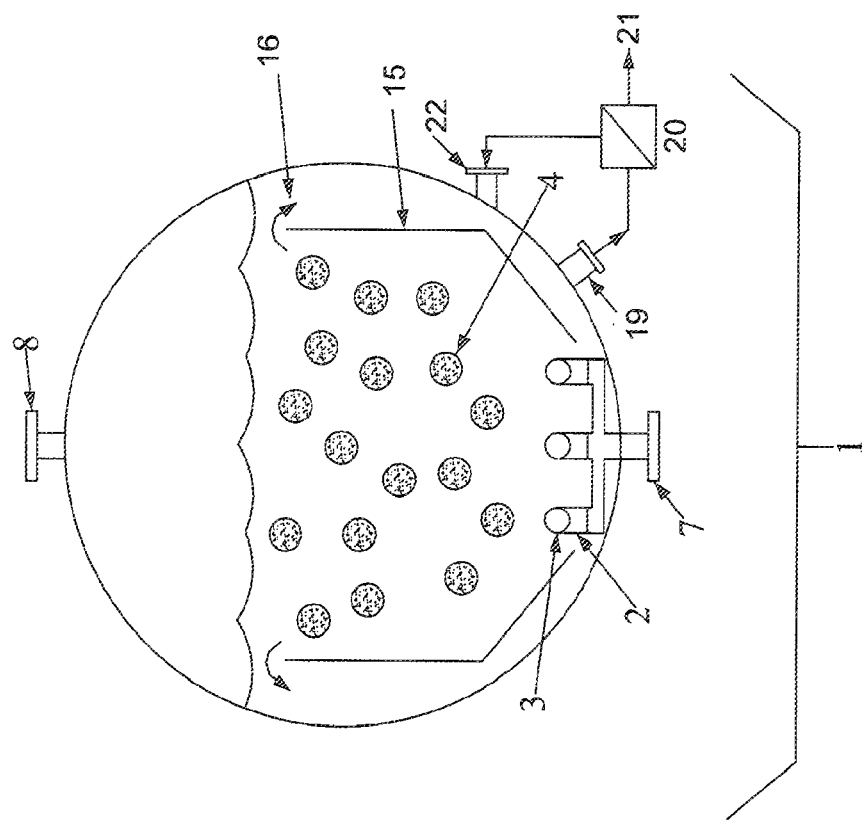
FIG. 3 illustrates a sectional view of an alternate preferred embodiment of a three phase slurry bubble column reactor.

FIG. 3 illustrates a sectional view of an alternate preferred embodiment of a reactor 1 of the present invention that has side walls 5. As set forth in detail in the previous embodiment, synthesis gas is introduced into the vessel through a gas distributor 2. The side wails 15 act as a downcomer as degassed slurry 16 of greater density at the perimeter of the reactor will fall and recycle into the bottom of the reactor vessel where it will be lifted by the bubbles 4 from the gas distributor 2. The side wall downcomer may also serve to normalize the variations in cross sectional area and gas velocity in the reactor. Feed gas enters at nozzle 7 and is distributed thru a pipe distributor 2 with a shroud 3 and exits at nozzle 8. Any variety of distributors known to one skilled in the art may be used. Slurry is withdrawn from nozzle 19 passed to filter 20 where a slip stream of product 21 is removed while concentrated slurry is returned to nozzle 22 alternately internal filters could be used.

Whereas, the present invention has been described in relation to the drawings attached hereto, it should be understood that other and further modifications, apart from those shown or suggested herein, may be made within the spirit and scope of this invention.

What is claimed is:

1. A single stage Fischer-Tropsch reactor system for carrying out a chemical reaction in a fluidized three phase slurry system, operating with an internal syngas recycle in a homogeneous flow regime which reactor system comprises:
    (a) a single stage cylindrical reaction vessel having a horizontal axis with a cross sectional area perpendicular to the gas flow, where said gas flow traverses the diameter of the cylindrical reactor from the bottom along the entire length of the reactor, where the reaction vessel has a top and a bottom and where the reaction vessel has a height perpendicular to both the horizontal axis and to the ground and a horizontal length where the horizontal length is greater than the height and wherein the cross sectional area varies with the height;
    (b) a fluidized three phase slurry system within the vessel operating with an internal syngas recycle in a homogeneous flow regime;
    (c) a synthesis feed gas inlet at or near the bottom of the reaction vessel where the feed gas inlet introduces synthesis feed gas into the reaction vessel;
    (d) a gas distributor system, with a plurality of orifices and nozzles at or near the bottom of the reaction vessel running the length of the bottom of the reactor where the gas distributor system provides for distribution of the feed gas along the reactor's length;
    (e) a single set of cooling coils in the reaction vessel to remove heat;
    (f) at least two sidewall downcomers to provide improved fluidization of catalyst particles throughout the reactor where the downcomers are perpendicular to the reactor longitudinal axis;
    (g) a conduit at or near the top of the reaction vessel for removal of unreacted feed gas, light products, and water; and
    (h) a solid liquid products separation system to remove liquid products from the reaction vessel.

2. The reactor system of claim 1 where the solid liquid products separation system comprises one or more of the following: internal filters, external filters, settlers, hydro cyclones, and magnetic devices.

3. The reactor system of claim 1 where the feed gas contains hydrogen and carbon monoxide.

4. The reactor for carrying out a chemical reaction in a three phase slurry system as set forth in claim 1 including internal draft tubes distributed radially within said vessel.

5. A single stage Fischer-Tropsch reactor system for carrying out a chemical reaction in a fluidized three phase slurry system operating with an internal syngas recycle in a homogeneous flow regime which reactor system comprises:
    (a) a single stage cylindrical reaction vessel having a horizontal axis with a cross sectional area perpendicular to the gas flow, where from the bottom and along the entire length of the reactor gas flow traverses the diameter of the cylinder, and where the reaction vessel has a top and a bottom and where the reaction vessel has a height perpendicular to both the horizontal axis and to the ground and a horizontal length greater than the height and wherein the cross sectional area varies with the height;
    (b) a fluidized three phase slurry system within the vessel operating with an internal syngas recycle in a homogeneous flow regime;
    (c) a synthesis gas inlet at or near the bottom of the reaction vessel for introduction of synthesis gas;
    (d) more than one gas distributor inside the single stage reactor vessel distributed in a sequential manner along the horizontal axis wherein synthesis feed through the gas distributors may vary;
    (e) wherein synthesis feed to a first distributor may correspond to fresh syngas feed and its subsequent distributors located inside the same reaction vessel contains mixtures of fresh feed and recycled tail gas;

(f) a conduit at or near the top of the reaction vessel for removal of unreacted feed gas, light hydrocarbon products and water;
(g) a single set of cooling coils in said reaction vessel to remove heat; and
(h) internal draft tubes within said reaction vessel to improve catalyst fluidization.

* * * * *